United States Patent

[11] 3,630,033

| [72] | Inventors | Ralph L. Tuttle<br>7135 Hollywood Boulevard, Hollywood, Calif. 90046;<br>George T. Lister, 3511 Fernwood Avenue, Los Angeles, Calif. 90039 |
|---|---|---|
| [21] | Appl. No. | 33,197 |
| [22] | Filed | Apr. 30, 1970 |
| [45] | Patented | Dec. 28, 1971 |

[54] APPARATUS FOR CONTROLLING OIL SLICKS
5 Claims, 7 Drawing Figs.

| [52] | U.S. Cl. | 61/1 F |
|---|---|---|
| [51] | Int. Cl. | E02b 15/04 |
| [50] | Field of Search | 61/1, 1 F, 34, 46.5 |

[56] References Cited
UNITED STATES PATENTS

| 2,939,290 | 6/1960 | Crake | 61/34 X |
|---|---|---|---|
| 3,476,246 | 11/1969 | Dahan | 61/1 X |

FOREIGN PATENTS

| 816,440 | 7/1959 | Great Britain | 61/1 |

*Primary Examiner*—J. Karl Bell
*Attorney*—Lyon & Lyon

ABSTRACT: An apparatus for controlling oil slicks which incorporates a plurality of modular flotation tanks joined together to form a closed structure, with a large gate therein to allow the structure to be positioned around an oil slick and control curtains extending vertically downward from the structure beneath the surface of the water and around the oil slick.

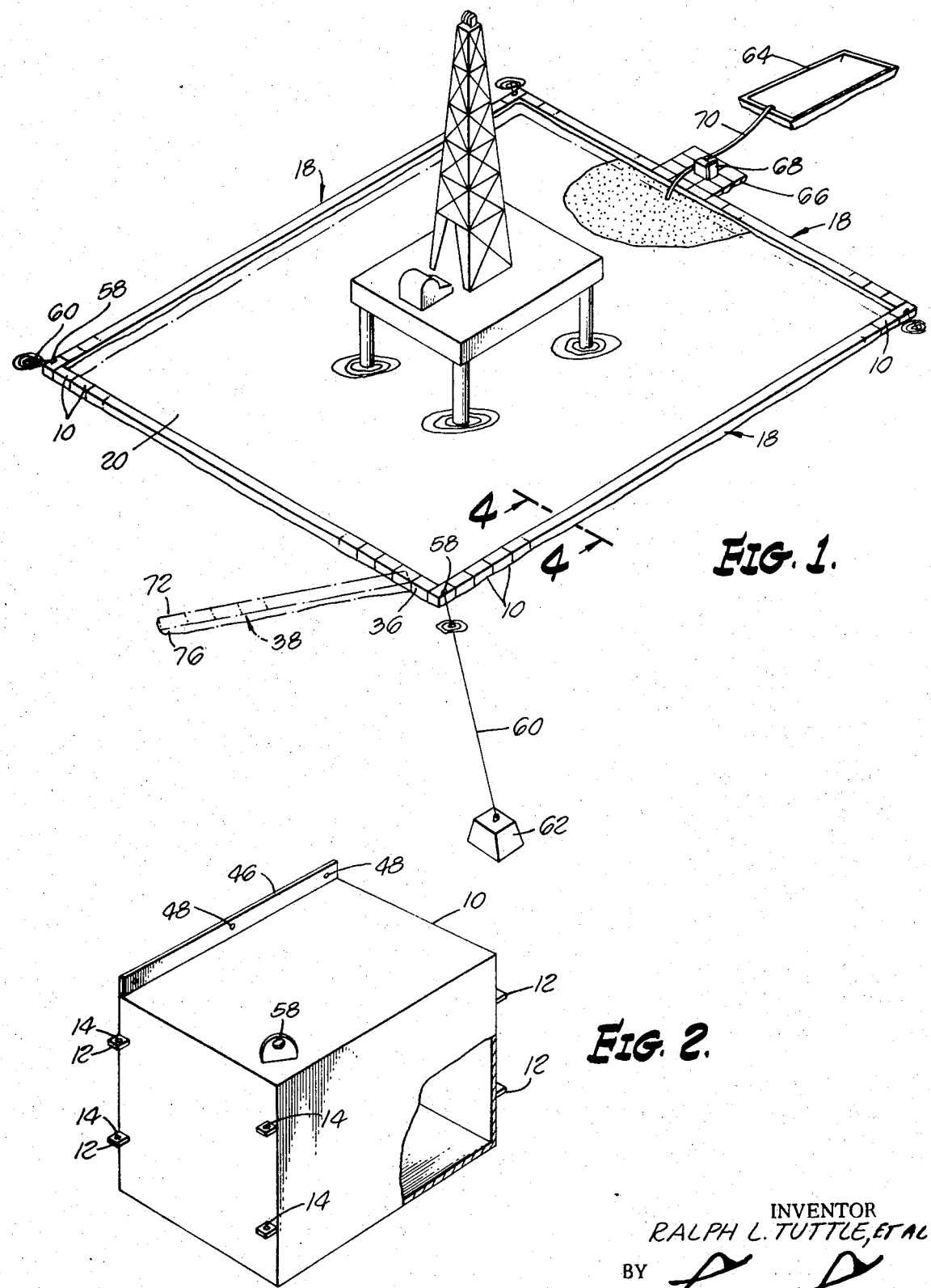

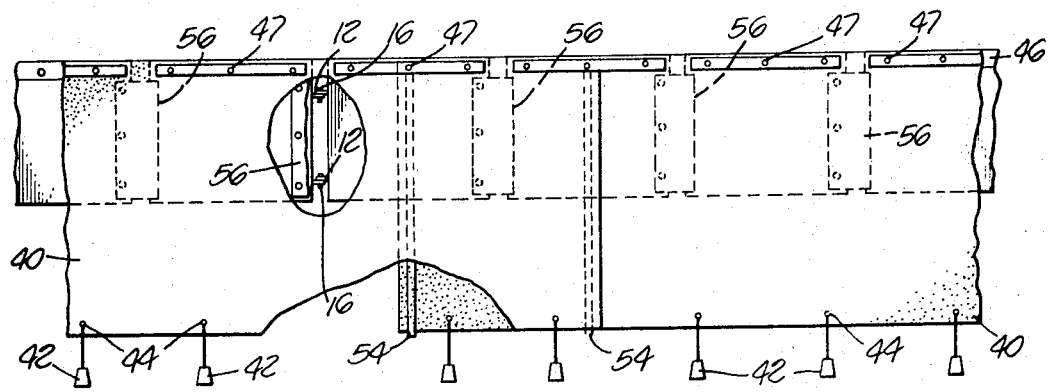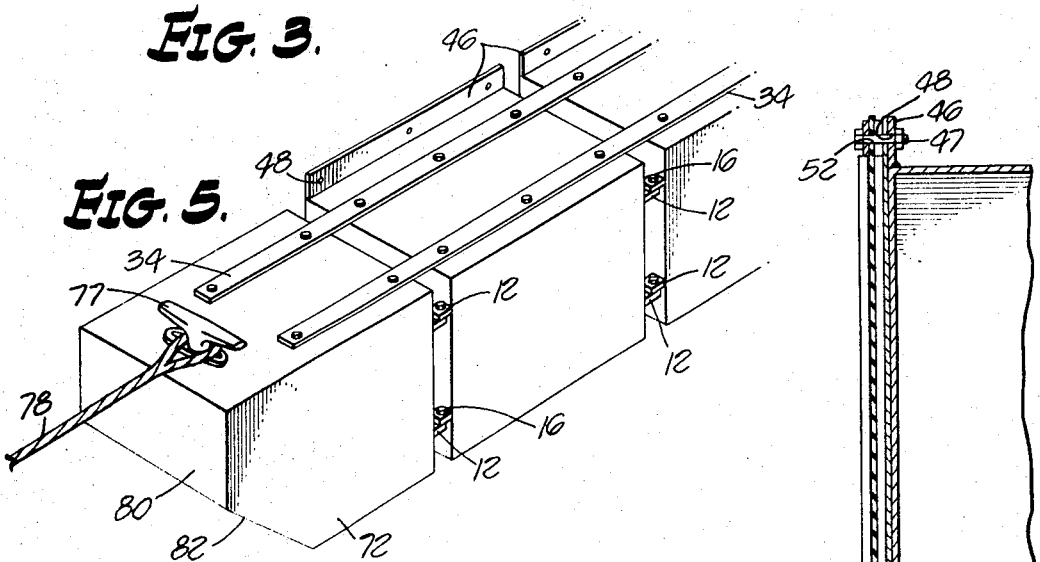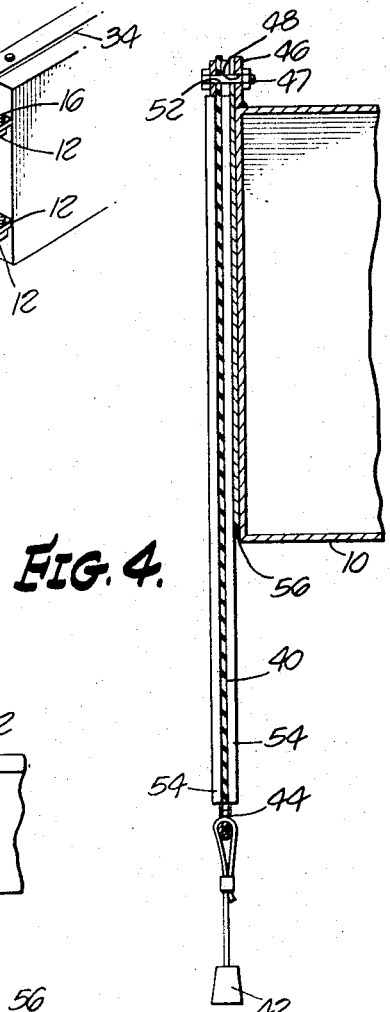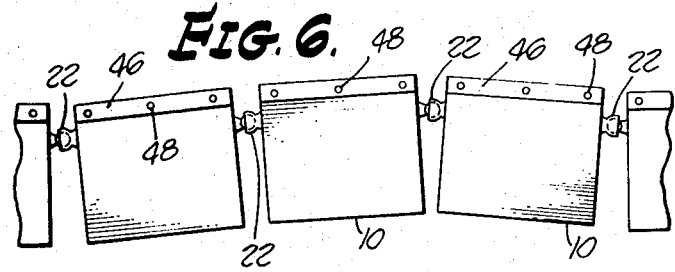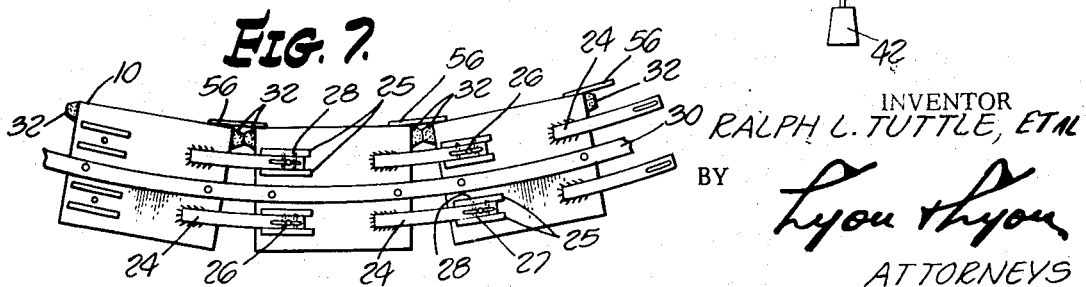

3,630,033

APPARATUS FOR CONTROLLING OIL SLICKS

This invention relates to an oil slick control apparatus of the type which surrounds the oil slick or area of potential oil slick, and in particular is directed to a flexible flotation structure which has vertical curtains extending downward from the structure preventing any escape of oil from the area enclosed by the structure.

A large source of oil is found in coastal beds which are tapped by off shore wells. A major concern of all oil companies engaged in off-shore drilling and of the public at large is the prevention and control of oil leaks associated with these off-shore wells. Due to the location of the wells, a tremendous amount of damage results when such a leak occurs. The escaped oil forms a slick on the ocean's surface due to oil's specific gravity being less than that of water, and the currents then carry these slicks onto the shore, resulting in tremendous damage to the land and a devastation of wild life.

It is therefore the principle object of this invention to provide an apparatus for controlling oil slicks.

It is a further object to provide an oil slick control apparatus which can be easily moved through the water to reach an oil slick.

It is another object of this invention to provide an oil slick control apparatus which is highly flexible facilitating the encircling of oil slick.

It is a further object of this invention to provide an oil slick control apparatus which is of simple construction and economical to manufacture.

These and other objects and advantages of the present invention will become apparent from the following detailed description taken in conjunction with the accompanying drawings.

Briefly, the control apparatus contains a series of large modular pontoons fastened one to another enclosing a rectangular or circular area. A large section of a side of the apparatus is pivotably mounted forming a large gate, thereby both providing access to the enclosed area by boat and allowing the apparatus to be moved about the slick; the slick being enclosed upon the closing of the gate. Control curtains, with anchors thereon, extend downward from the pontoon system thereby preventing the escape of any oil from the enclosed area.

IN THE DRAWINGS

FIG. 1 shows an isometric elevation of the control apparatus positioned about an off-shore well in conjunction with a secondary tank.

FIG. 2 is an isometric elevation of a pontoon with a portion of a sidewall cut away.

FIG. 3 is a plan view of the apparatus showing the control curtain in attached relation to the pontoons.

FIG. 4 is a cross section of the apparatus taken along line 4—4 in FIG. 1.

FIG. 5 is an isometric elevation of pontoons attached in rigid relationship to one another.

FIG. 6 is a plan view of pontoons attached in flexible relationship to one another.

FIG. 7 is an isometric elevation of pontoons attached in a circular configuration.

Referring now in detail to the drawings, the apparatus is comprised of: a plurality of modular pontoons 10. Each pontoon has secured thereto fastening flanges 12. The fastening flanges each have apertures 14 therein. The pontoons can then be fastened one to another by aligning the flanges and placing a bolt 16 through apertures 14 as shown in FIGS. 3 and 5. The pontoons are then joined by the flanges as described to form assembly 18, which encloses an area 20, as shown in FIG. 1.

Due to the fact that the apparatus is designated for use on the sea, it will be subject to constant ocean swells. To prevent undue strain on the assembly and eventual material failure and breaking apart of the assembly, ball and socket connectors 22 can be secured to the pontoons 10 as shown in FIG. 6. The use of connectors 22 allow flexibility in assembly 18 in the vertical and horizontal directions. Such connectors can be used on all pontoons in place of fastening flanges 12 or can be used only on pontoons which are placed at intervals between pontoons using fastening flanges 12, thus providing a somewhat flexible yet more stable assembly.

Another method of joining adjacent pontoons to form assembly 18 is seen in FIG. 7. Curved guide means 24 are mounted atop pontoons 10. Guide pins 26 are positioned atop the opposite ends of said pontoons and between support brackets 25. The pontoons are then fastened together to form assembly 18 by inserting the guide pin 26 in guide means 24 of the adjacent pontoon. Due to the curvature of guide means 24, their use forms a generally circular assembly 18. Flexible connectors 22 may be utilized in conjunction with guide means 24 thereby adding additional strength to the flexible circular assembly. Curved guide means 24 have apertures 27 on either side thereof adapted to receive locking pins 28. When the locking pins are pushed through apertures 26, linear movement of guide pins 26 within guide means 24 is prevented thereby locking assembly 18 in a given configuration. A reinforcing plate 30 may also be affixed to the upper portion of pontoons 10 to give additional strength to the circular assembly, when locked in a rigid configuration. Bumper guards 32 are secured to pontoons 10 as shown in FIG. 7, to prevent any metal or metal contact between adjacent pontoons when fastened in a flexible assembly.

The modular pontoons 10 used in assembly 18 can be of varying types. An ideal and readily available pontoon is the military ponton. They are constructed of plate steel and are extremely durable. Because of the durability of the ponton, there would be less risk of material failure in the assembly 18 and hence flanges 12 would generally be used as opposed to flexible connectors 22. However, for additional strength, reinforcing plates 34 are fastened atop the pontons securing one to another, as shown in FIG. 5. If a circular assembly were desired, guide means 24 and guide pins 26 would be used in conjunction with the military ponton, providing a durable circular assembly. Lighter pontoons can also be used in assembly 18. They could be constructed from a light metal such as aluminum and filled with a floating agent such as polystrene to add additional buoyancy to the modular pontoons to protect against a leak therein. The pontoons could also be entirely constructed from a buoyant material such as polystrene, although, such a pontoon would lack durability. If a less durable pontoon is used as opposed to the ponton, greater use would have to be made of the flexible connectors 22 than rigid flanges 12 to prevent material failure and breaking apart of the assembly caused by the ocean swells and rough seas.

In order to allow the assembly 18, which is closed on all sides to prevent the escape of any oil, to be positioned about an oil slick, it is necessary to replace the fastening flanges 12 on a pair of adjoining pontoons with hinging means (not shown) 36, at providing the control apparatus with a large gate 38, as shown in FIG. 1. With gate 38 in the opened position, assembly 18 can be positioned about a slick or desired area. Upon encircling the desired area, gate 38 is closed. Gate 38 also provides an access by boat to an oil well within the enclosed area.

To contain the oil slick enclosed by assembly 18, control curtains 40 are fastened to pontoons 10. Control curtains 40 extend vertically downward from the pontoons beneath the surface of the water, with weights 42 being attached to the lower portion of the curtains at 44 to maintain the control curtains 40 in the vertical position. Each pontoon has a mounting plate 46 secured thereto, each mounting plate having a plurality of apertures 48 therein. The control curtains 40 are then fastened to mounting plates 46 by use of bolt means 47 which extend through apertures 48 in said mounting means 46 and through apertures 52 in the upper portion of the control curtains. The control curtains are constructed out of a durable and flexible material such as rubber sheeting. Due to the fact that such sheeting typically comes in certain lengths, the control curtains must be sectioned to fit a particular assembly. To prevent any loss of oil between the sections, the sections are fastened to mounting plates 46 in overlapping relationship to one another and rigid strips 54 are positioned on either side of the overlapping sheets, as shown in FIG. 3, creating self-sealing gaskets which prevent oil from escaping the enclosed area. Shields 56 are secured to pontoons 10 to prevent control curtains 40 from being pinched between adjacent pontoons thereby weakening the curtains.

Line attachments 58 are attached to pontoons 10. A line 60 is secured to attachments 58 and can be used to move the assembly in the water. In order for the assembly to hold a given position about a designated area, anchor means 62 are attached to lines 60, thereby securing the assembly in fixed relation to the ocean floor. In operation, the enclosed area may fill with oil and it may become necessary to pump the oil out of the area encircled by the assembly into a barge or second storage area, designated 64 in FIG. 1. To facilitate this operation, a pumping platform 66 is provided which consists of several pontoons fastened together and located adjacent pontoons 10 in the assembly. The size of the platform is determined by the number of pontoons used. A pumping means 68 is positioned on platform 64, a hose 70 is then run from the enclosed area 20 to the pumping means 68 and from the pumping means to the barge or second storage area 64. The oil is then pumped from the assembly into the barge or second storage area. It should be noted that assembly 18 can itself be used as a second storage area.

When moving the assembly over the water towards the oil slick or area to be encircled, gate 38 is in the opened position and the entire assembly is towed by lead pontoons 72. The lead pontoons 72 would be positioned at the locking point 76 of gates 38. When the assembly is quite large and hence must be moved in sections, additional gates 38 are provided with lead pontoons positioned at the locking points 76 of the gates thereby allowing separate movement of the sections in the water. Lead pontoons have a cleat 77 affixed thereon, to which a tow line 78 is attached, as shown in FIG. 5. The forward end 80 of lead pontoons 74, has an angled front wall 82 forming a prow, which reduces the drag as the assembly is pulled across the water to the desired location, thus reducing the necessary towing force.

What is claimed is:

1. An apparatus for controlling oil slicks which comprises a plurality of modular pontoons, fastening means secured to said pontoons, said pontoons being joined together by said fastening means forming a closed assembly, hinging means positioned on a pair of adjacent pontoons whereby a plurality of said pontoons can be rotated outwardly of said assembly, control curtains extending vertically downward from said pontoons, a mounting plate secured to each of said pontoons adapted for mounting said curtains, said curtains being mounted about said assembly in adjacent and overlapping relation to one another, rigid strips being affixed to the overlapping portion of said adjacent curtains in sandwiched relation thereto forming a self-sealing gasket thereby preventing oil from escaping the enclosed area, and weight means attached to said curtains thereby mounting said curtains in a vertical position.

2. The apparatus of claim 1 wherein at least one of said pontoons has an inclined front wall forming a prow on said pontoon thereby reducing the drag of said pontoon in the water while being towed.

3. The apparatus of claim 2 wherein a plurality of pontoons are fastened together by said fastening means forming a platform, said platform being positioned adjacent to one or more of said pontoons forming said assembly.

4. The apparatus of claim 3 wherein a plurality of said fastening means form flexible connections between adjacent pontoons thereby allowing horizontal and vertical movement of said pontoons with respect to adjacent pontoons thereby providing a flexible assembly.

5. The apparatus of claim 4 wherein said fastening means comprises curved guide means having apertures therein, guide pins adapted to move linearly within said guide means, and locking pins adapted to pass through said apertures thereby preventing linear movement of said pins within said guide means.

* * * * *